United States Patent
Yuki et al.

(10) Patent No.: US 8,086,109 B2
(45) Date of Patent: Dec. 27, 2011

(54) POLARIZATION MULTIPLEXED OPTICAL TRANSMITTING AND RECEIVING APPARATUS

(75) Inventors: Masahiro Yuki, Kawasaki (JP); Kentaro Nakamura, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 502 days.

(21) Appl. No.: 12/318,433

(22) Filed: Dec. 29, 2008

(65) Prior Publication Data

US 2009/0274469 A1 Nov. 5, 2009

(30) Foreign Application Priority Data

Apr. 30, 2008 (JP) ................................. 2008-119011

(51) Int. Cl.
H04J 14/06 (2006.01)
H04B 10/00 (2006.01)
H04B 10/04 (2006.01)

(52) U.S. Cl. ............ 398/152; 398/65; 398/184; 398/162
(58) Field of Classification Search .................. 398/152, 398/65, 184
See application file for complete search history.

(56) References Cited

U.S. PATENT DOCUMENTS

| | | | |
|---|---|---|---|
| 6,714,742 B1 * | 3/2004 | Hayee et al. | 398/65 |
| 6,894,780 B2 * | 5/2005 | Tucker | 356/364 |
| 6,972,842 B2 * | 12/2005 | Doerr et al. | 356/364 |
| 7,043,122 B2 * | 5/2006 | Han et al. | 385/37 |
| 2003/0175033 A1 * | 9/2003 | Taga et al. | 398/152 |
| 2008/0138070 A1 * | 6/2008 | Yan et al. | 398/65 |
| 2008/0232816 A1 * | 9/2008 | Hoshida et al. | 398/152 |
| 2009/0103921 A1 * | 4/2009 | Frankel | 398/65 |
| 2010/0067914 A1 * | 3/2010 | Tanaka et al. | 398/102 |
| 2010/0196016 A1 * | 8/2010 | Zhang et al. | 398/152 |
| 2011/0044702 A1 * | 2/2011 | Mizuguchi et al. | 398/184 |
| 2011/0206375 A1 * | 8/2011 | Xiong et al. | 398/65 |

FOREIGN PATENT DOCUMENTS

| | | |
|---|---|---|
| JP | 2002-344426 | 11/2002 |
| JP | 2003-338805 | 11/2003 |
| JP | 2005-65027 | 3/2005 |

* cited by examiner

*Primary Examiner* — Kenneth N Vanderpuye
*Assistant Examiner* — Amritbir Sandhu
(74) *Attorney, Agent, or Firm* — Staas & Halsey LLP (57) ABSTRACT

In a polarization multiplexed optical transmitting and receiving apparatus, output light from a light source section of a transmission unit is separated in a polarization separating section, and then modulated in first and second modulation sections, and the modulated lights are synthesized in a polarization synthesizing section, and transmitted to an optical transmission line. Then the polarization multiplexed light propagated through the optical transmission line is demodulated in a reception section of a reception unit, and together with this, transmission characteristic information of the reception light is transferred to the transmission unit. The transmission unit that receives the transmission characteristics information controls a delay section that adjusts a delay amount of relative phases of drive signals of the modulation sections, so that the transmission characteristics of the polarization multiplexed light are within an allowable range. As a result, pulse timing between orthogonal polarization components of the polarization multiplexed light can be flexibly changed with a simple configuration.

13 Claims, 10 Drawing Sheets

POLARIZATION MULTIPLEXED OPTICAL TRANSMITTING AND RECEIVING APPARATUS

CROSS-REFERENCE TO RELATED APPLICATION

This application is based upon and claims the benefit of priority of the prior Japanese Patent Application No. 2008-119011, filed on Apr. 30, 2008, the entire contents of which are incorporated herein by reference.

FIELD

The present invention relates to a polarization multiplexed optical transmitting and receiving apparatus which transfers an optical signal by using a polarization multiplexing technique in an optical transmission system.

BACKGROUND

To realize a super high-speed optical transmission system of 40 Gbit/s or more, adoption of the polarization multiplexing technique has attracted attention. The polarization multiplexing technique is one that focuses on a fact that there are two polarization states orthogonal to each other in the same wavelength, and is a method that transmits two pieces of independent signal information by using the two polarization states. For the optical transmission system using the polarization multiplexing technique, various control techniques have been proposed for improving the transmission quality of polarization multiplexed light (for example, refer to Japanese Laid-open Patent Publication No. 2002-344426, Japanese Laid-open Patent Publication No. 2003-338805, and Japanese Laid-open Patent Publication No. 2005-65027).

Figure 11:
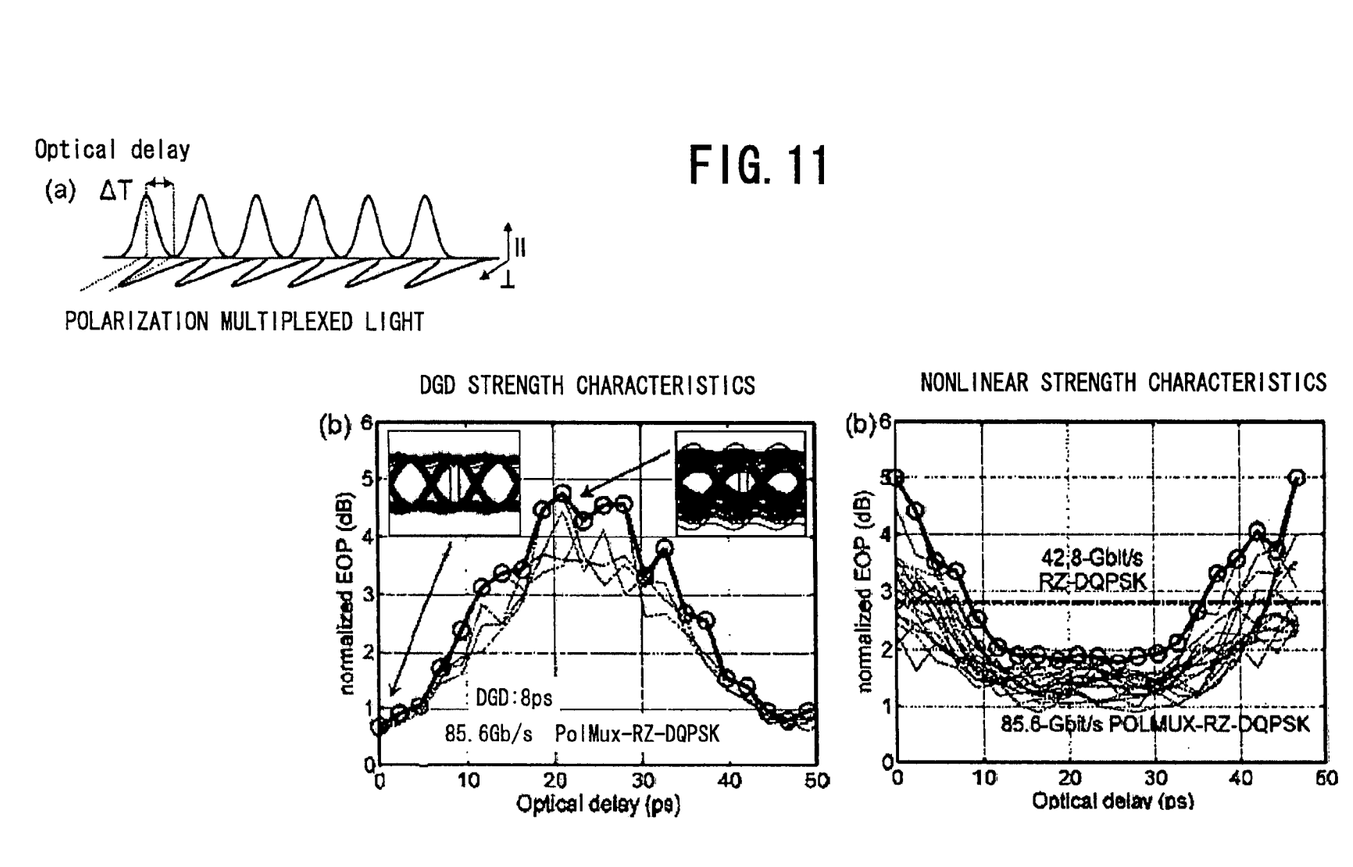
FIG. 11 is a diagram for explaining deterioration of transmission quality of polarization multiplexed light.

Incidentally in the abovementioned polarization multiplexed optical transmission system, it is known that a degradation amount of transmission characteristics occurring due to a fiber nonlinear effect and polarization mode dispersion (PMD) is different according to the pulse timing between orthogonal polarization components of the polarization multiplexed light (for example, refer to D. van den Borne, et al., "1.6-b/s/Hz Spectrally Efficient Transmission Over 1700 km of SSMF Using 40×85.6-Gb/s POLMUX-RZ-DQPSK", Journal of Lightwave Technology, Vol. 25, No. 1, pp. 222-232, Jan. 2, 2007). Specifically, as illustrated in FIG. 11, in view of fiber nonlinear tolerance, time-interleaved polarization multiplexing in which a pulse between orthogonal polarization components of the polarization multiplexed light is shifted by half a bit, becomes an excellent transmission characteristic (right side in FIG. 11). On the other hand, in view of PMD tolerance, time-aligned polarization multiplexing in which pulse timing between orthogonal polarization components of the polarization multiplexed light become the same phase, becomes an excellent transmission characteristic (middle in FIG. 11). Accordingly, in order to obtain a desired transmission characteristic, the pulse timing needs to be set according to the state of the optical transmission system.

However, in the conventional polarization multiplexed optical transmission system, the pulse timing between the orthogonal polarization components is fixed by the initial setting of an apparatus that generates the polarization multiplexed light. Accordingly, even if a change of the system state such as; a time fluctuation of the PMD, a change of a wavelength path, or a change of a channel spacing occurs, the pulse timing between the orthogonal polarization components cannot be adjusted according to the change. Therefore, there is a problem in that the transmission characteristics significantly deteriorate due to the system state.

In order to make the pulse timing between the orthogonal polarization components alterable to deal with the abovementioned problem, for example, a configuration can be considered where a plurality of transmitters is prepared corresponding to different pulse timing, and the transmitters are switched and used corresponding to the system state. However, there is a disadvantage in that the apparatus becomes large, complicated, and expensive since a plurality of transmitters is provided. Moreover, in a configuration where the pulse timing between the orthogonal polarization components of one transmitter is manually changed according to the system state, a changing operation of the pulse timing takes a long time. Therefore when the system state changes at a high speed and frequently, it is difficult to correspond to such a change.

SUMMARY

According to one aspect of the invention, a polarization multiplexed optical transmitting and receiving apparatus includes; a transmission unit that generates polarization multiplexed light including first and second optical signals with polarization states orthogonal to each other, and transmits the polarization multiplexed light to an optical transmission line, and a reception unit that receives the polarization multiplexed light transmitted through the optical transmission line. The reception unit includes: a reception section that receives the polarization multiplexed light transmitted through the optical transmission line, and performs demodulation processing of the received light; a transmission-characteristic information monitoring section that monitors transmission characteristic information of the polarization multiplexed light obtained in a process of the demodulation processing in the reception section; and a transmission-characteristic information transfer section that transmits the transmission characteristic information monitored by the transmission-characteristic information monitoring section to the transmission unit. Moreover the transmission unit includes: a light source section; a polarization separating section that separates an output light of the light source section into two lights with the polarization states orthogonal to each other; a first modulation section that modulates one of the lights separated by the polarization separating section, and generates the first optical signal; a second modulation section that modulates the other light separated by the polarization separating section, and generates the second optical signal; a polarization synthesizing section that synthesizes the first and second optical signals respectively output from the first and second modulation sections, and transmits the polarization multiplexed light to the optical transmission line; an adjustment section that variably adjusts a relative pulse timing between the first and second optical signals respectively output from the first and second modulation sections; and a control section that controls an adjustment amount in the adjustment section so that the transmission characteristics of the polarization multiplexed light are within a pre-set allowable range, based on the transmission characteristic information transmitted from the transmission-characteristic information transfer section.

In the abovementioned polarization multiplexed optical transmitting and receiving apparatus, after the output light of the light source section of the transmission unit is separated into two lights with the polarization states orthogonal to each other by the polarization separating section, the lights are respectively modulated by the first and second modulation sections, and the first and second optical signals output from the respective modulation sections are synthesized by the polarization synthesizing section and transmitted to the optical transmission line. Then when the polarization multiplexed light transmitted through the optical transmission line is received by the reception unit, the demodulation processing of the received light is performed in the reception section, and together with this the information related to the transmission characteristics of the polarization multiplexed light is monitored by the transmission-characteristic information monitoring section, and the transmission characteristic information is transmitted from the transmission-characteristic information transfer section to the transmission unit. In the transmission unit that has received the transmission characteristic information, the control section controls the adjustment section to adjust the relative pulse timing between the first and second optical signals so that the transmission characteristics of the polarization multiplexed light are within the allowable range.

According to the polarization multiplexed optical transmitting and receiving apparatus described above, the pulse timing between the orthogonal polarization components of the polarization multiplexed light can be easily and flexibly changed by a combination of a small size transmission unit and reception unit, with a simple configuration. Therefore deterioration of the transmission characteristics of the polarization multiplexed light due to a change of the system state can be suppressed.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Hereinafter, embodiments of the present invention will be described with reference to the appended drawings. Throughout all the figures, the same reference symbols denote the same or equivalent parts.

Figure 1:
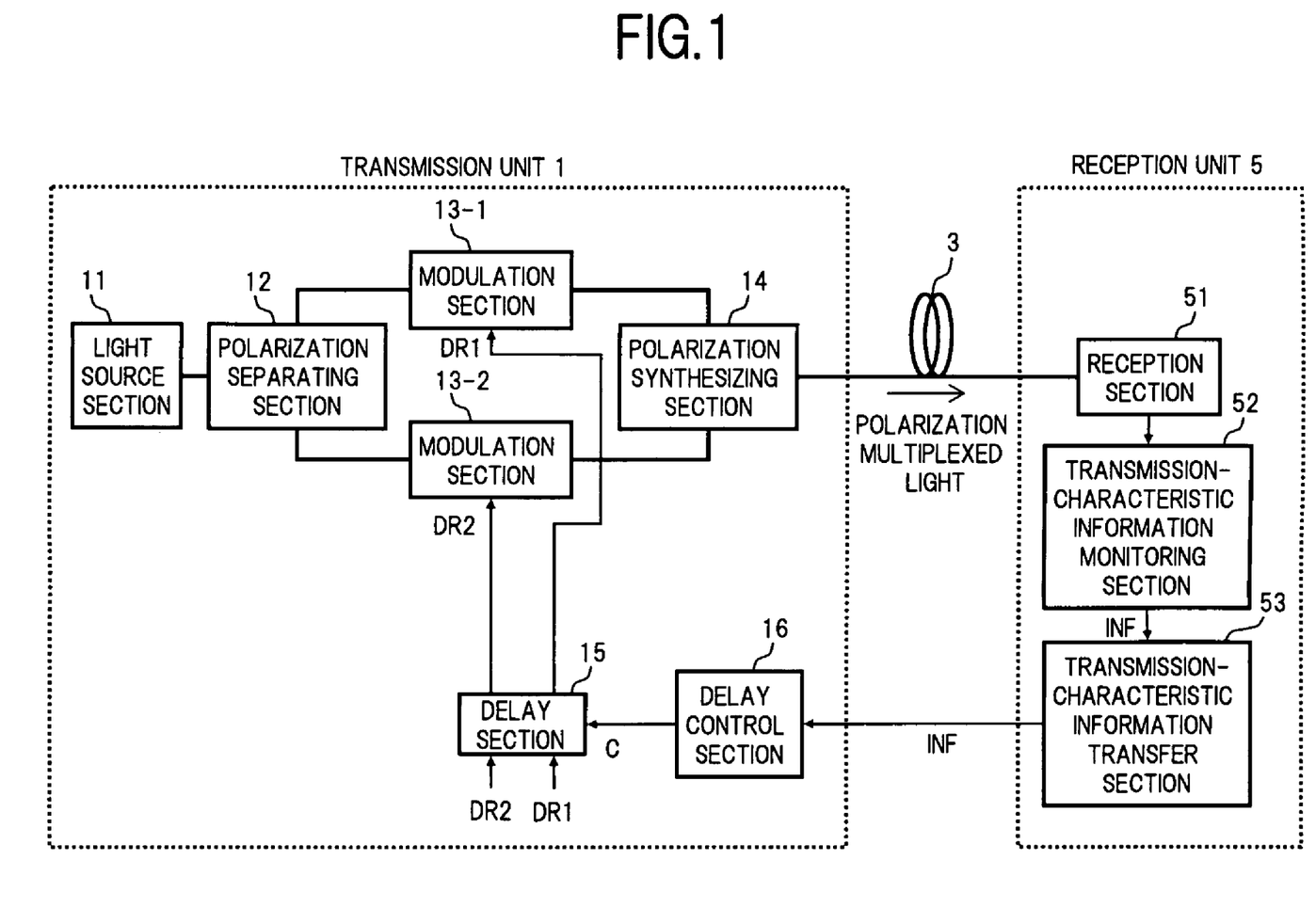
FIG. 1 is a block diagram showing one embodiment of a polarization multiplexed optical transmitting and receiving apparatus according to the present invention.

FIG. 1 is a block diagram showing a configuration of one embodiment of the polarization multiplexed optical transmitting and receiving apparatus.

In FIG. 1, the polarization multiplexed optical transmitting and receiving apparatus includes, for example, a transmission unit 1 that generates polarization multiplexed light and transmits the light to an optical transmission line 3, and a reception unit 5 that receives the polarization multiplexed light which has propagated through the optical transmission line 3. Moreover the transmission unit 1 includes, for example, a light source section 11, a polarization separating section 12, two modulation sections 13-1 and 13-2, a polarization synthesizing section 14, a delay section 15, and a delay control section 16. Moreover, the reception unit includes, for example, a reception section 51, a transmission-characteristic information monitoring section 52, and a transmission-characteristic information transfer section 53.

Specifically, the light source section 11 in the transmission unit 1 generates continuous light having a required wavelength, or an optical pulse train, and outputs the light to the polarization separating section 12.

The polarization separating section 12 separates the output light of the light source section 11 into two lights with the polarization states orthogonal to each other, and outputs one of the lights to the modulation section 13-1, and outputs the other light to the modulation section 13-2.

The respective lights polarized and separated by the polarization separating section 12 are input to the respective modulation sections 13-1 and 13-2, with the polarization state being retained. The modulation sections 13-1 and 13-2 modulate the input light according to drive signals DR1 and DR2 corresponding to transmission data, to thereby output optical signals in a desired modulation format to the polarization synthesizing section 14. As the modulation format of the optical signals output from the respective modulation sections 13-1 and 13-2, for example, an intensity modulation format such as non return to zero (NRZ) and return to zero (RZ), a phase modulation format such as quadrature phase shift keying (QPSK), differential quadrature phase shift keying (DQPSK), binary phase shift keying (BPSK), or differential binary phase shift keying (DBPSK), or a combination of these intensity modulation format and phase modulation format can be applied.

The polarization synthesizing section 14 synthesizes respective optical signals with the polarization states orthogonal to each other, output from the respective modulation sections 13-1 and 13-2, into one and transmits the polarization multiplexed light to the optical transmission line 3.

The delay section 15 variably adjusts a delay amount (phase shift amount) of the relative phases of the drive signals DR1 and DR2 provided to the respective modulation sections 13-1 and 13-2. Here, a configuration example in which both of the drive signals DR1 and DR2 are provided to the delay section 15 is shown. However, one of the drive signals may be set as a reference, and only the other drive signal may be provided to the delay section 15 to adjust the delay amount of the relative phases.

The delay control section 16 generates a control signal C for controlling the delay amount in the delay section 15 based on information INF related to the transmission characteristics of the polarization multiplexed light described later transferred from the reception unit 5, and outputs the control signal C to the delay section 15. Since the delay amount of the delay section 15 is controlled according to the control signal C, the pulse timing between orthogonal polarization components is optimized, and deterioration of the transmission characteristics when the system state is changed is suppressed.

In the configuration of the transmission unit 1 described above, the delay section 15 and the delay control section 16 function as an adjustment section and a control section respectively.

The reception section 51 in the reception unit 5 receives the polarization multiplexed light transmitted through the optical transmission line 3, and performs demodulation processing of the received light by using a well-known optical receiver corresponding to the modulation format.

The transmission-characteristic information monitoring section 52 monitors the information related to the transmission characteristics of the polarization multiplexed light (hereinafter, referred to as transmission characteristic information) INF obtained in the step of the demodulation processing in the reception section 51. As a specific example of this transmission characteristic information INF, number of errors, number of error corrections, bit error rate (BER), or Q value can be mentioned. These values can be obtained by using output information of a forward error correction (FEC) circuit, or using a B1 byte of a signal frame conforming to the SONET/SDH standard, a BER monitor, a Q value monitor, or the like.

The transmission-characteristic information transfer section 53 uses a well-known information transmission device (for example, a system management unit that centrally controls a monitoring signal transmitted and received between nodes on the system, or the operation of the entire system) between the transmission unit 1 and the reception unit 5 to transmit the transmission characteristic information INF obtained by the transmission-characteristic information monitoring section 52 to the delay control section 16 in the transmission unit 1.

Next is a description of the operation of the embodiment.

In the polarization multiplexed optical transmitting and receiving apparatus having the above configuration, in the transmission unit 1, the output light from the light source section 11 is separated into two lights with the polarization states orthogonal to each other by the polarization separating section 12. The two lights are then respectively modulated by the respective modulation sections 13-1 and 13-2, and the respective modulated lights are synchronized by the polarization synthesizing section 14, to generate the polarization multiplexed light. At this time, the relative phases of the drive signals DR1 and DR2 respectively driving the modulation sections 13-1 and 13-2, are variably adjusted by the delay section 15, with the delay amount controlled according to the control signal C from the delay control section 16. The polarization multiplexed light transmitted from the transmission unit 1 to the optical transmission line 3, on reaching the reception unit 5, is received and demodulated by the reception section 51, and together with this the transmission characteristic information INF thereof is monitored by the transmission-characteristic information monitoring section 52 and transmitted to the delay control section 16 of the transmission unit 1 by the transmission-characteristic information transfer section 53.

Figure 2:
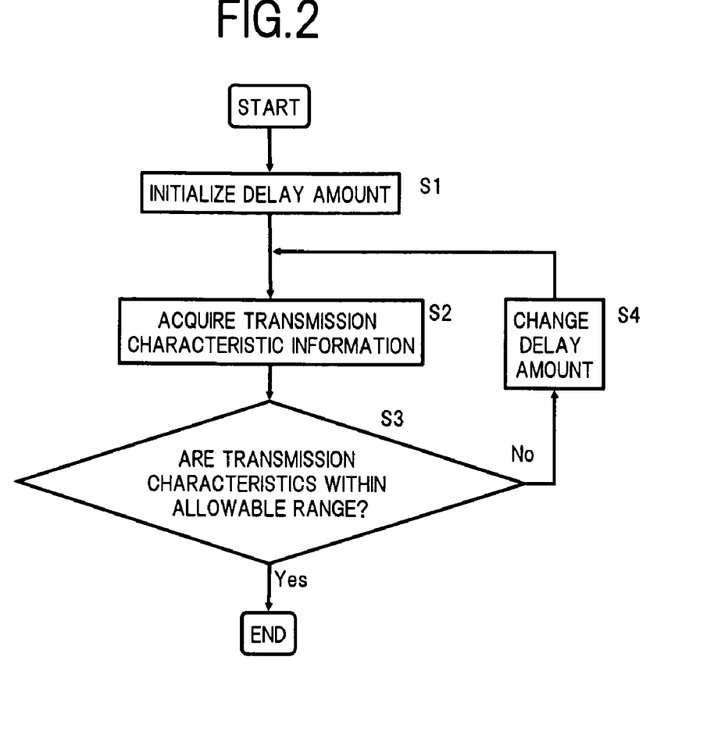
FIG. 2 is a flowchart for explaining an operation of a delay control section in the embodiment.

Here one example of the control operation by the delay control section 16 is described, with reference to the flowchart in FIG. 2.

When control is started, the delay control section 16 at first sets the delay amount in the delay section 15 to an initial value (S1). Then the delay control section 16 acquires the transmission characteristic information INF transmitted from the transmission-characteristic information transfer section 53 of the reception unit 5 (S2), and determines whether or not the transmission characteristic information INF thereof is within a range allowed by the system (S3). When the transmission characteristic is not within the allowable range, the delay control section 16 changes the setting of the delay amount in the delay section 15 with a required variation width (S4), and re-acquires the transmission characteristic information INF, and repeats the process from S2 to S4 until the transmission characteristic becomes within the allowable range.

Figure 3:
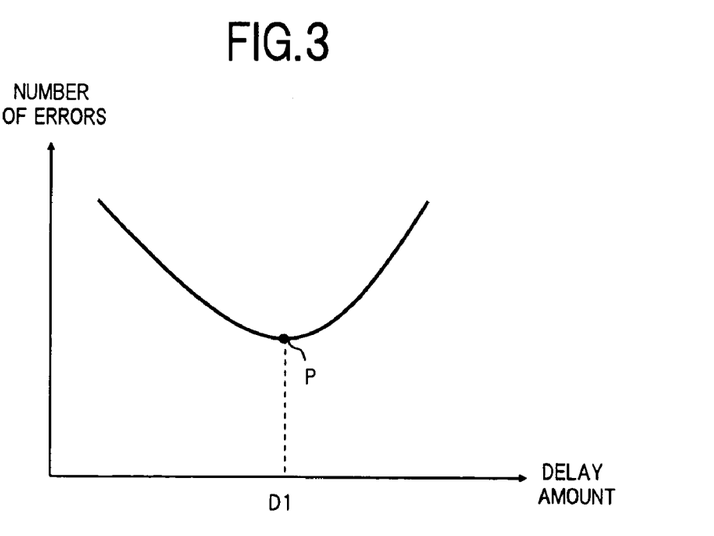
FIG. 3 is a diagram showing one example of a delay amount set by the delay control section in the embodiment.
Figure 4:
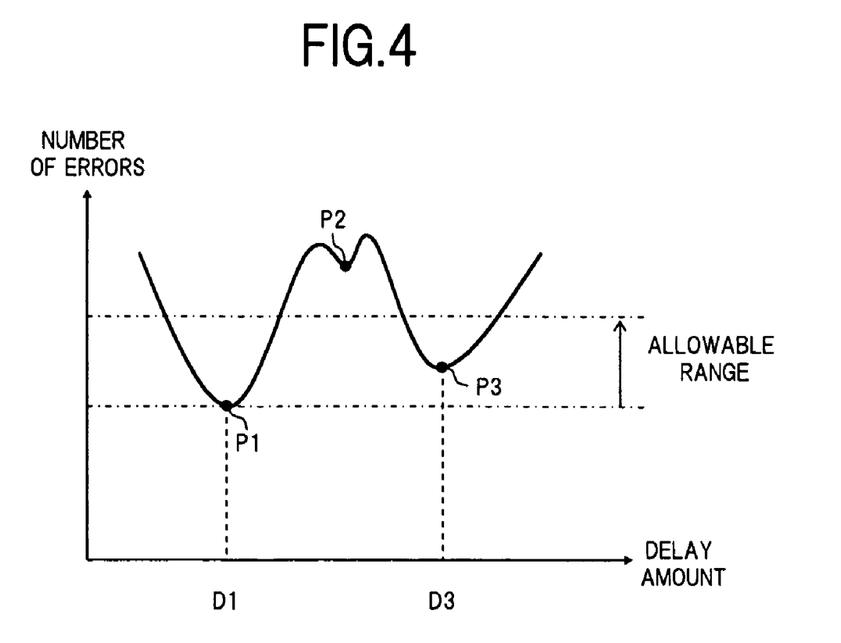
FIG. 4 is a diagram showing another example of the delay amount set by the delay control section in the embodiment.

FIGS. 3 and 4 show a specific example of the delay amount set for the delay section 15 by the control operation of the delay control section 16 described above. Here, a case is assumed where the number of errors detected by the reception section 51 is transmitted to the delay control section 16 as the transmission characteristic information INF. When the number of errors changes in a curved line as shown in FIG. 3 with respect to the change of the delay amount in the delay section 15, point P at which the number of errors becomes the smallest is regarded as an optimum point of the transmission characteristic, and a delay amount D1 corresponding thereto is set in the delay section 15. Moreover, as shown in FIG. 4, when the number of errors with respect to the change of the delay amount becomes a local minimum at a plurality of points P1, P2 and P3, either one of the local minimum points P1 and P3 present within the allowable range of the number of errors in the system is selected, and the delay amount corresponding thereto is set in the delay section 15.

Detection of the minimum point or the local minimum point of the number of errors described above can be realized by, for example, acquiring the number of errors at a reception end while sweeping the delay amount of the delay section 15 over a range of a half cycle or more of one time slot of the transmission data. In this case, the transmission characteristics may vary in a time shorter than the time for sweeping the delay amount once. However, in such a situation, the monitoring time of the transmission characteristics with the respective delay amounts can be extended, or the delay amount can be swept several times to acquire a mean value.

According to the polarization multiplexed optical transmitting and receiving apparatus as described above, the pulse timing between the orthogonal polarization components can be easily and flexibly changed according to the state of the optical transmission system, by combining the small size transmission unit 1 and reception unit 5, with a simple configuration, so that it is possible to suppress deterioration of the transmission characteristics.

Figure 5:
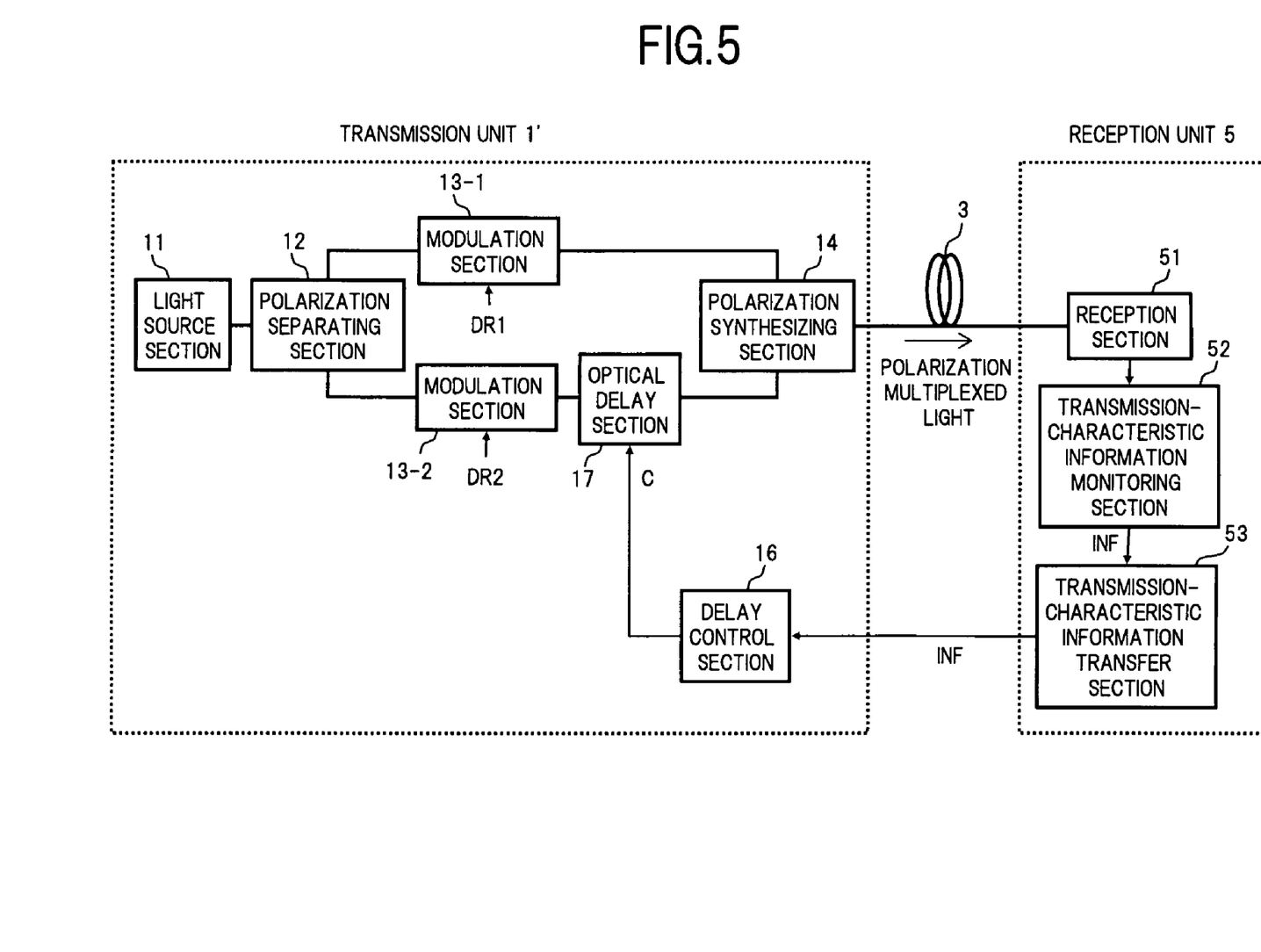
FIG. 5 is a diagram showing another configuration example of the polarization multiplexed optical transmitting and receiving apparatus associated with the embodiment.

In the embodiment of the polarization multiplexed optical transmitting and receiving apparatus, a configuration example is shown in which the pulse timing between the orthogonal polarization components can be changed by variably adjusting the delay amount of the relative phases of the drive signals DR1 and DR2 provided to the respective modulation sections 13-1 and 13-2 in the transmission unit 1 by the delay section 15. However, for example as shown in a transmission unit 1' in FIG. 5, an optical delay section 17 may be provided on the optical path between the modulation section 13-2 and the polarization synthesizing section 14, instead of the delay section 15, so that the pulse timing between the orthogonal polarization components is changed by controlling an optical delay amount in the optical delay section 17 according to a control signal C from the delay control section 16. In the example shown in FIG. 5, the optical delay section 17 is arranged on the modulation section 13-2 side. However, of course the optical delay section can be arranged on the modulation section 13-1 side or on the both sides of the modulation sections 13-1 and 13-2. In such a configuration, the optical delay section 17 functions as the adjustment section.

Figure 6:
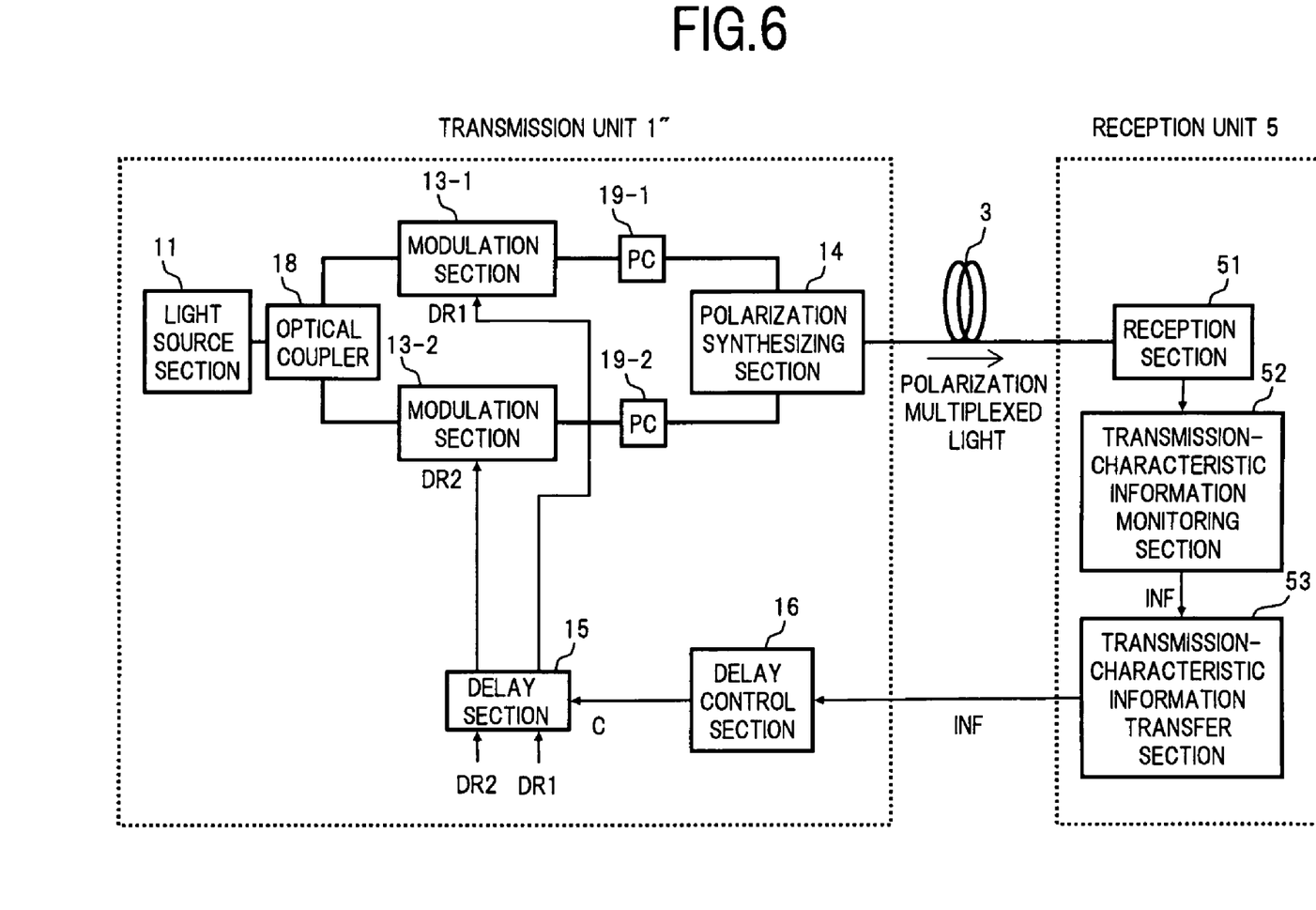
FIG. 6 is a diagram showing yet another configuration example of the polarization multiplexed optical transmitting and receiving apparatus associated with the embodiment.

Moreover in the configuration example shown in FIG. 1, the output light of the light source section 11 is polarized and separated by the polarization separating section 12. However for example, as shown in a transmission unit 1" in FIG. 6, an optical coupler 18 may be provided instead of the polarization separating section 12, and polarization controllers (PC) 19-1 and 19-2 may be provided on the respective optical paths between the optical coupler 18 and the polarization synthesizing section 14, to thereby realize the same function as that of the polarization separating section 12.

Next is a description of a specific example of the aforementioned transmission unit 1 shown in FIG. 1.

Figure 7:
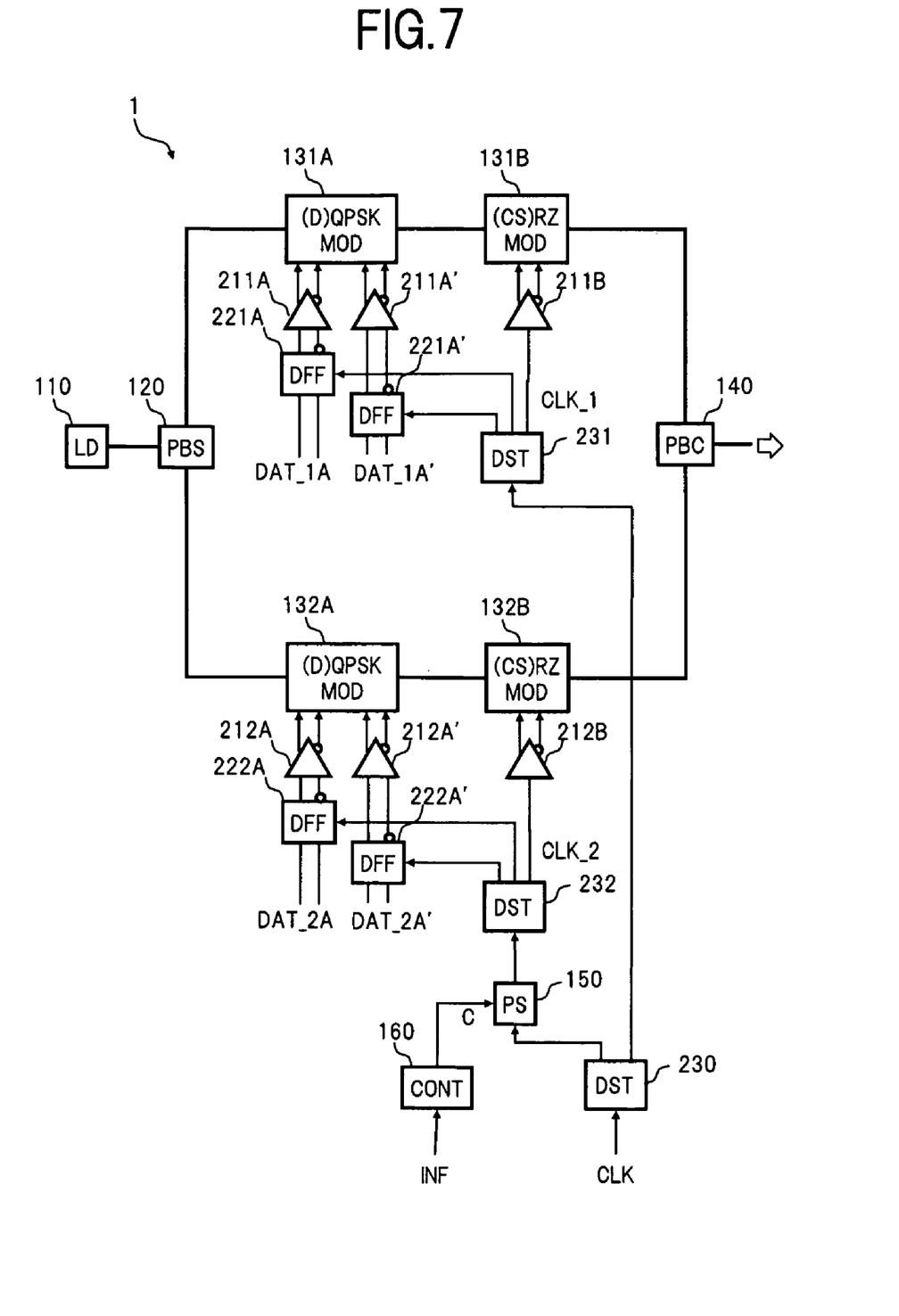
FIG. 7 is a block diagram showing a first embodiment for a transmission unit in FIG. 1.

FIG. 7 is a block diagram showing a configuration of a first embodiment of the transmission unit 1. In the first embodiment, a configuration of the transmission unit 1 corresponding to any one of the modulation formats of RZ-QPSK, RZ-DQPSK, carrier-suppressed (CS) RZ-QPSK, or CSRZ-DQPSK (hereinafter, referred to as (CS)RZ-(D)QPSK modulation format) is described.

In the transmission unit 1 in FIG. 7, the output light from a semiconductor laser (LD) 110 is polarized and separated by a polarized beam splitter (PBS) 120, and the two lights with the polarization states orthogonal to each other are input to phase modulators ((D)QPSKMOD) 131A and 132A corresponding to the (D)QPSK format. A well-known dual drive type (D)QPSK modulator is here applied to the respective phase modulators 131A and 132A. In the phase modulator 131A, a pair of data signals DAT_1A and DAT_1A' are provided to driver amplifiers 211A and 211A' via D flip flops (DFF) 221A and 221A', and input light is (D)QPSK-modulated by drive signals output from the driver amplifiers 211A and 211A'. Moreover in the phase modulator 132A also, a pair of data signals DAT_2A and DAT_2A' are provided to driver amplifiers 212A and 212A' via D flip flops (DFF) 222A and 222A', and input light is (D)QPSK-modulated by the drive signals output from the driver amplifiers 212A and 212A'.

At this time, to clock input terminals of the D flip flops 221A and 221A' on the phase modulator 131A side is respectively input a clock signal CLK_1 obtained by further branching into three by a distribution section 231, one of a clock signal CLK branched into two by a distribution section (DST) 230. On the other hand, to clock input terminals of the D flip flops 222A and 222A' on the phase modulator 132A side is respectively input a clock signal CLK_2 obtained by providing the other of the clock signal CLK branched into two by the distribution section 230 to a phase shifter (PS) 150 to give a delay, and then further branching the output signal of the phase shifter 150 into three by a distribution section 232. The phase shifter 150 corresponds to the aforementioned delay section 15 in FIG. 1. The relative timing of the (D)QPSK signal lights output from the respective phase modulators 131A and 132A is adjusted by controlling the phase shift amount (delay amount) of the phase shifter 150 according to the control signal C from a delay control circuit (CONT) 160.

The (D)QPSK signal lights output from the phase modulators 131A and 132A are further input to intensity modulators ((CS)RZMOD) 131B and 132B corresponding to the (CS)RZ format. In the respective intensity modulators 131B and 132B, the clock signals CLK_1 and CLK_2 respectively output from the distribution sections 231 and 232 are provided to the driver amplifiers 211B and 212B, and the (D)QPSK signal light is (CS)RZ-modulated by the drive signals output from the driver amplifiers 211B and 212B. As a result, the (CS)RZ-(D)QPSK signal light with the relative pulse timing being optimized according to the system state is output from the respective intensity modulators 131B and 132B. Then the (CS)RZ-(D)QPSK signal lights from the respective intensity modulators 131B and 132B are synthesized by a polarization beam combiner (PBC) 140, to thereby transmit the polarization-multiplexed (CS)RZ-(D)QPSK signal light to the optical transmission line 3.

According to the first embodiment as described above, a small size transmission unit can be realized with a simple configuration in which the pulse timing between the (CS)RZ-(D)QPSK signal lights with the polarization states orthogonal to each other, can be easily and flexibly changed.

In the first embodiment of the transmission unit 1, the relative timing between; the respective drive signals of the phase modulator 131A and the intensity modulator 131B, and the respective drive signals of the phase modulator 132A and the intensity modulator 132B is variably adjusted by combining the phase shifter 150, the D flip flops 221A, 221A', 222A, and 222A', and the distribution sections 230, 231, and 232. However, for example, as shown in FIG. 8, the phase shifters 151A, 151A', 152A, 152A', 151B, and 152B can be respectively provided on input stages of the driver amplifiers 211A, 211A', 212A, 212A', 211B and 212B corresponding to the respective phase modulators 131A and 132A and the respective intensity modulators 131B and 132B to control the phase shift amount in the respective phase shifters according to the control signal C from the delay control circuit 160.

Figure 8:
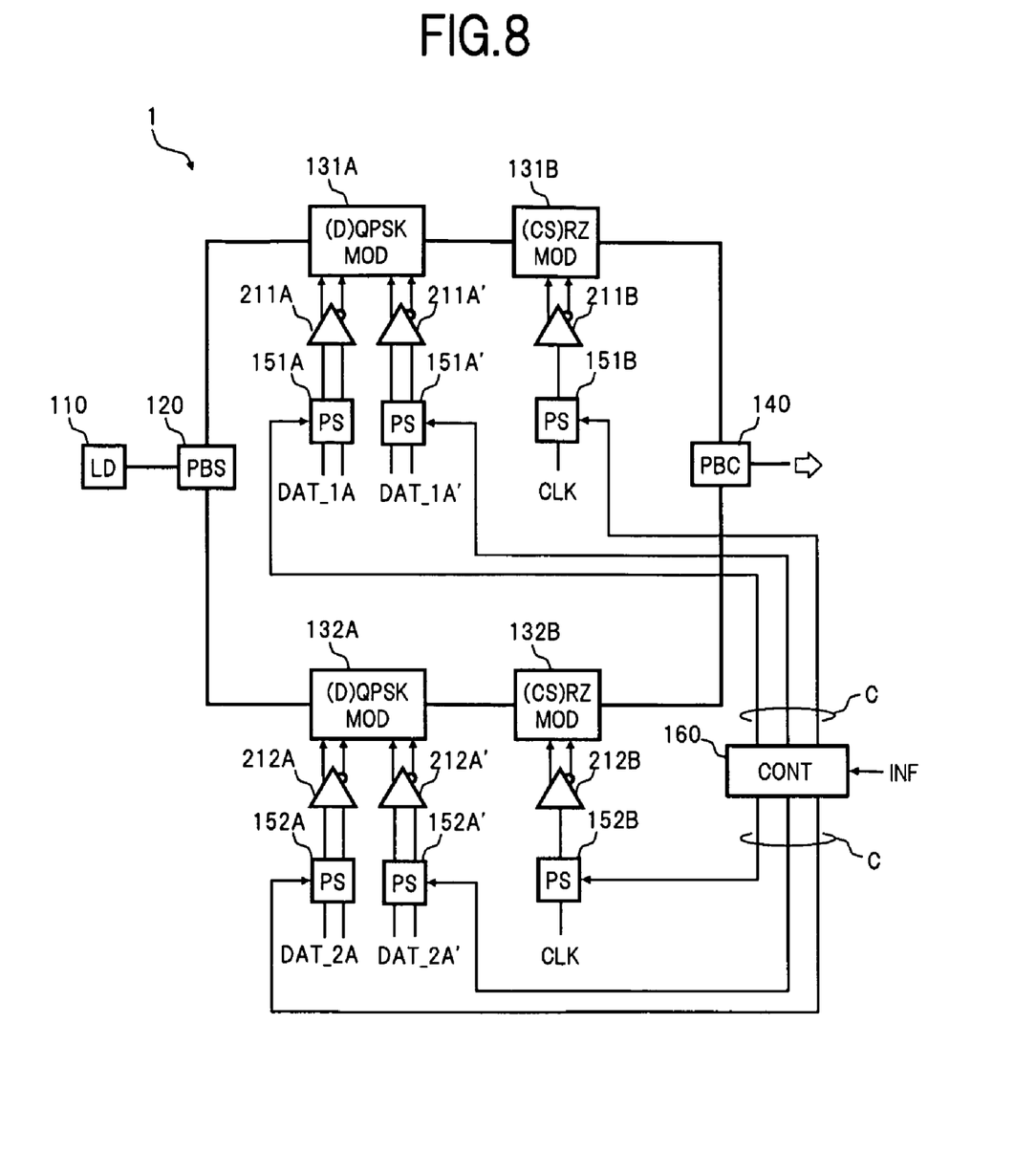
FIG. 8 is a diagram showing another configuration example associated with the first embodiment of the transmission unit.

In the configuration examples shown in FIGS. 7 and 8, the dual drive type is applied to the respective phase modulators 131A and 132A, however of course a single drive type can also be applied thereto. Moreover as a modification example of FIG. 7 and FIG. 8, a transmission unit corresponding to the NRZ-(D)QPSK modulation format can be constituted by omitting the intensity modulators 131B and 132B.

Figure 9:
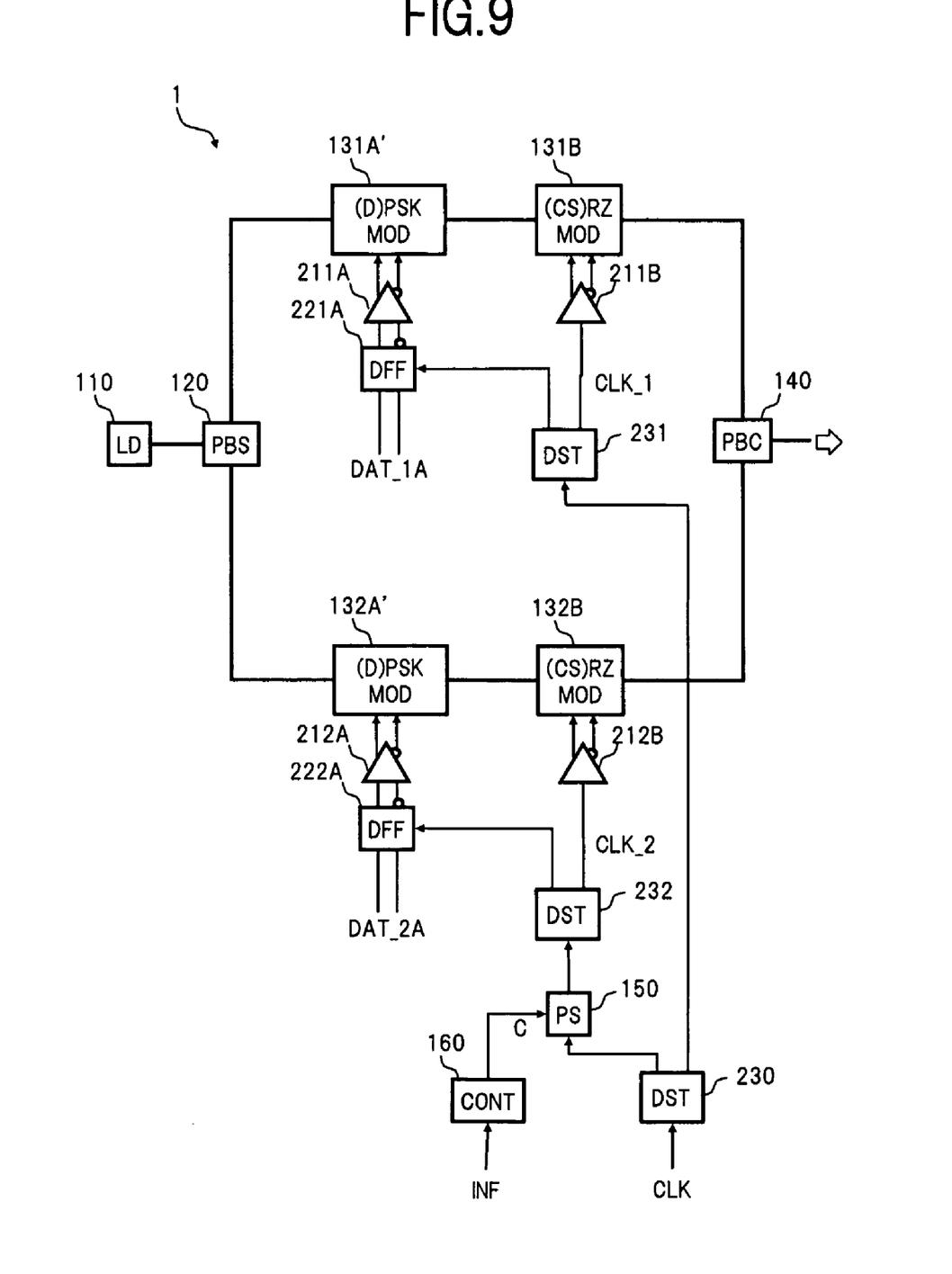
FIG. 9 is a block diagram showing a second embodiment for the transmission unit in FIG. 1.

FIG. 9 is a block diagram showing a second embodiment of the transmission unit 1. In the second embodiment, a configuration of the transmission unit 1 corresponding to any one of the modulation formats of RZ-BPSK, RZ-DBPSK, CSRZ-BPSK, or CSRZ-DBPSK (hereinafter, referred to as (CS)RZ-(D)BPSK modulation format) is described.

A point where the configuration of the second embodiment shown in FIG. 9 is different to the configuration of the aforementioned first embodiment shown in FIG. 7 is that in the respective phase modulators 131A' and 132A' arranged on the subsequent stage of the PBS 120, the input light is respectively (D)BPSK-modulated by the drive signals output from the driver amplifiers 211A and 212A, to which data signals DAT_1A and DAT_2A are respectively provided via the D flip flops (DFF) 221A and 222A. According to the second embodiment, a small size transmission unit can be realized with a simple configuration in which the pulse timing between the (CS)RZ-(D)BPSK signal lights with the polarization states orthogonal to each other, can be easily and flexibly changed.

Figure 10:
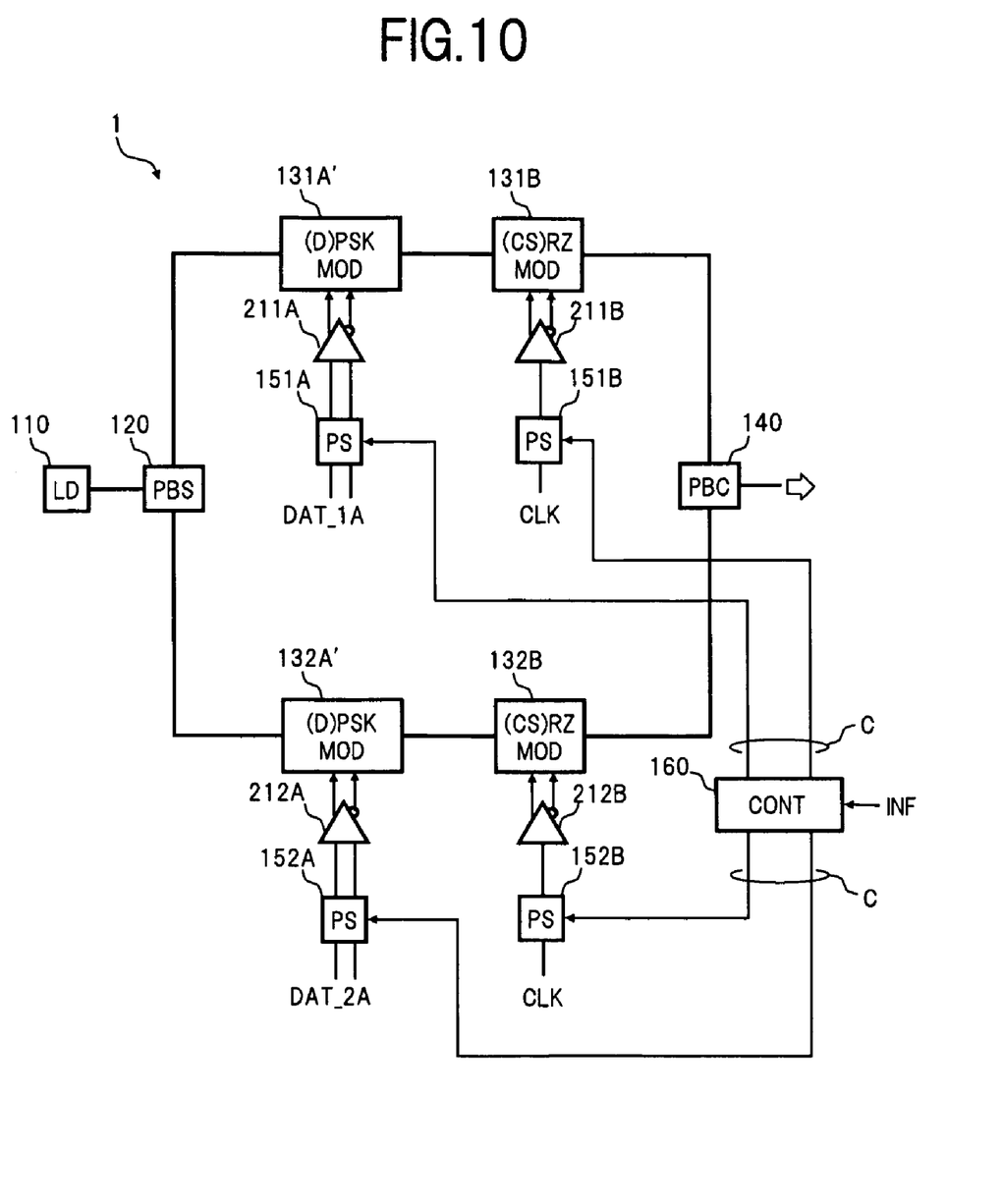
FIG. 10 is a diagram showing another configuration example associated with the second embodiment of the transmission unit.

Also in the second embodiment, the relative timing between; the respective drive signals of the phase modulator 131A' and the intensity modulator 131B, and the respective drive signals of the phase modulator 132A' and the intensity modulator 132B is variably adjusted by combining the phase shifter 150, the D flip flops 221A and 222A, and the distribution sections 230, 231, and 232. However, for example, as shown in FIG. 10, phase shifters 151A, 152A, 151B, and 152B can be respectively provided on the input stage of the driver amplifiers 211A, 212A, 211B and 212B corresponding to the respective phase modulators 131A' and 132A' and the respective intensity modulators 131B and 132B, to control the phase shift amount in the respective phase shifters according to the control signal C from the delay control circuit 160. Moreover it is of course possible to change the configuration of the respective phase modulators 131A' and 132A' from the dual drive type to the single drive type. Furthermore a transmission unit corresponding to the NRZ-(D)BPSK modulation format can be constructed by omitting the intensity modulators 131B and 132B.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A polarization multiplexed optical transmitting and receiving apparatus comprising;
    a transmission unit that generates polarization multiplexed light including first and second optical signals with polarization states orthogonal to each other, and transmits the polarization multiplexed light to an optical transmission line, and
    a reception unit that receives the polarization multiplexed light transmitted through the optical transmission line, wherein,
    the reception unit includes:
    a reception section that receives the polarization multiplexed light transmitted through the optical transmission line, and performs demodulation processing of the received light;
    a transmission-characteristic information monitoring section that monitors transmission characteristic information of the polarization multiplexed light obtained in a process of the demodulation processing in the reception section; and
    a transmission-characteristic information transfer section that transmits the transmission characteristic information monitored by the transmission-characteristic information monitoring section to the transmission unit, and
    the transmission unit includes:
    a light source section;
    a polarization separating section that separates an output light of the light source section into two lights with the polarization states orthogonal to each other;
    a first modulation section that modulates one of the lights separated by the polarization separating section, and generates the first optical signal;
    a second modulation section that modulates the other light separated by the polarization separating section, and generates the second optical signal;
    a polarization synthesizing section that synthesizes the first and second optical signals respectively output from the first and second modulation sections, and transmits the polarization multiplexed light to the optical transmission line;
    an adjustment section that variably adjusts a relative pulse timing between the first and second optical signals respectively output from the first and second modulation sections; and
    a control section that controls an adjustment amount in the adjustment section so that the transmission characteristics of the polarization multiplexed light are within a pre-set allowable range, based on the transmission characteristic information transmitted from the transmission-characteristic information transfer section.

2. A polarization multiplexed optical transmitting and receiving apparatus according to claim 1, wherein
    the adjustment section adjusts a delay amount of relative phases of a first drive signal that drives the first modulation section, and a second drive signal that drives the second modulation section.

3. A polarization multiplexed optical transmitting and receiving apparatus according to claim 1, wherein
    the adjustment section adjusts a delay amount of relative phases of the first and second optical signals respectively output from the first and second modulation sections.

4. A polarization multiplexed optical transmitting and receiving apparatus according to claim 1, wherein
    the transmission characteristic information includes at least one of; number of errors, number of error corrections, bit error rate, and Q value.

5. A polarization multiplexed optical transmitting and receiving apparatus according to claim 1, wherein
    the first and second modulation sections each have an intensity modulator.

6. A polarization multiplexed optical transmitting and receiving apparatus according to claim 5, wherein
    the intensity modulator corresponds to either one of the modulation formats of RZ and CSRZ.

7. A polarization multiplexed optical transmitting and receiving apparatus according to claim 1, wherein
    the first and second modulation sections each have a phase modulator.

8. A polarization multiplexed optical transmitting and receiving apparatus according to claim 7, wherein
    the phase modulator corresponds to any one of the modulation formats of QPSK, DQPSK, BPSK, and DBPSK.

9. A polarization multiplexed optical transmitting and receiving apparatus according to claim 1, wherein
    the first and second modulation sections each have a cascade connected phase modulator and an intensity modulator.

10. A polarization multiplexed optical transmitting and receiving apparatus according to claim 9, wherein
    the first and second modulation sections each output an optical signal corresponding to any one of the modulation formats of RZ-QPSK, RZ-DQPSK, RZ-BPSK, RZ-DBPSK, CSRZ-QPSK, CSRZ-DQPSK, CSRZ-BPSK, and CSRZ-DBPSK.

11. A polarization multiplexed optical transmitting and receiving apparatus according to claim 1, wherein
    the control section acquires the transmission characteristic information transmitted from the transmission-characteristic information transfer section, while sweeping an adjustment amount in the adjustment section over a range of a half cycle or more of one time slot of the transmission data, and sets an adjustment amount where the transmission characteristics become ideal based on the acquired transmission characteristic information, in the adjustment section.

12. A polarization multiplexed optical transmitting and receiving apparatus according to claim 1, wherein the polarization separating section has a polarization beam splitter into which is input output light of the light source section, and the first modulation section receives one output light of the polarization beam splitter, and the second modulation section receives an other output light of the polarization beam splitter.

13. A polarization multiplexed optical transmitting and receiving apparatus according to claim 1, wherein the polarization separating section has: an optical coupler that branches output light of the light source section into two; a first polarization controller arranged on an optical path between one output port of the optical coupler and one input port of the polarization synthesizing section; and a second polarization controller arranged on an optical path between an other output port of the optical coupler and other input port of the polarization synthesizing section.

* * * * *